US011116130B2

(12) United States Patent
Phillip et al.

(10) Patent No.: US 11,116,130 B2
(45) Date of Patent: Sep. 14, 2021

(54) UTILITY MACHINE OPERABLE IN STAND-ON AND WALK-BEHIND MODES

(71) Applicant: Ariens Company, Brillion, WI (US)

(72) Inventors: Thomas E. Phillip, Hilbert, WI (US); Aric Hamburg, Fond du Lac, WI (US); William D. Maile, De Pere, WI (US); Craig Key, Green Bay, WI (US); Brent P. Berglund, Brillion, WI (US); Michael Rukamp, Brillion, WI (US); Andrew Donati, Appleton, WI (US); Jeffrey M. Berchem, New Holstein, WI (US); John Adams, Manitowoc, WI (US)

(73) Assignee: Ariens Company, Brillion, WI (US)

( * ) Notice: Subject to any disclaimer, the term of this patent is extended or adjusted under 35 U.S.C. 154(b) by 68 days.

(21) Appl. No.: 16/321,851

(22) PCT Filed: Aug. 9, 2017

(86) PCT No.: PCT/US2017/046092
§ 371 (c)(1),
(2) Date: Jan. 30, 2019

(87) PCT Pub. No.: WO2018/031652
PCT Pub. Date: Feb. 15, 2018

(65) Prior Publication Data
US 2019/0166758 A1    Jun. 6, 2019

Related U.S. Application Data

(60) Provisional application No. 62/372,423, filed on Aug. 9, 2016.

(51) Int. Cl.
*A01D 34/82* (2006.01)
*A01D 34/00* (2006.01)
(Continued)

(52) U.S. Cl.
CPC ......... *A01D 34/824* (2013.01); *A01D 34/001* (2013.01); *A01D 34/66* (2013.01);
(Continued)

(58) Field of Classification Search
CPC ........ B62D 51/02; B62D 51/04; B62D 51/01; B62D 55/08; B62D 11/08; A01D 34/82;
(Continued)

(56) References Cited

U.S. PATENT DOCUMENTS 2,965,386 A * 12/1960 Buske ................... A01D 34/824
                                                    280/47.371
4,878,339 A * 11/1989 Marier ................... A01D 34/64
                                                    56/14.7
(Continued)

FOREIGN PATENT DOCUMENTS

FR           3022209 A1 * 12/2015    ............. B62D 51/04

OTHER PUBLICATIONS

US 9,493,180 B2, 11/2016, Ito et al. (withdrawn)
(Continued)

*Primary Examiner* — Thomas B Will
*Assistant Examiner* — Madeline Ivy Runco
(74) *Attorney, Agent, or Firm* — Michael Best & Friedrich LLP

(57) ABSTRACT

A utility machine, such as an outdoor power equipment unit such as a lawn mower, includes a work unit performing work in addition to motive power for the utility machine and a trailer occupied by an operator in a standing position. The operator may seamlessly step onto the trailer to operate the machine in stand-on mode and step off the trailer to operate the machine in walk-behind mode. The trailer remains in the deployed condition in both stand-on mode and walk-behind mode.

12 Claims, 12 Drawing Sheets

(51) Int. Cl.
*B62D 11/08* (2006.01)
*B62D 51/02* (2006.01)
*B62D 51/04* (2006.01)
*B62D 55/08* (2006.01)
*A01D 34/69* (2006.01)
*A01D 34/66* (2006.01)
A01D 34/64 (2006.01)
A01D 69/10 (2006.01)
A01D 34/68 (2006.01)
A01D 34/74 (2006.01)
A01D 101/00 (2006.01)
B62D 1/02 (2006.01)
B62D 11/02 (2006.01)

(52) U.S. Cl.
CPC ............ *A01D 34/69* (2013.01); *A01D 34/82* (2013.01); *B62D 11/08* (2013.01); *B62D 51/02* (2013.01); *B62D 51/04* (2013.01); A01D 34/6806 (2013.01); A01D 34/74 (2013.01); A01D 69/10 (2013.01); A01D 2034/645 (2013.01); A01D 2034/6843 (2013.01); A01D 2101/00 (2013.01); B62D 1/02 (2013.01); B62D 11/02 (2013.01); B62D 55/08 (2013.01)

(58) Field of Classification Search
CPC .... A01D 34/824; A01D 34/001; A01D 69/10; A01D 2034/6843
See application file for complete search history.

(56) References Cited

U.S. PATENT DOCUMENTS

| | | | | |
|---|---|---|---|---|
| 5,307,612 | A * | 5/1994 | Tomiyama | A01D 34/68 56/11.1 |
| 5,517,809 | A * | 5/1996 | Rich | A01D 34/6806 56/2 |
| 5,636,504 | A * | 6/1997 | Kaley | A01D 34/001 16/437 |
| 5,653,466 | A | 8/1997 | Berrios | |
| 5,785,453 | A * | 7/1998 | Marty | E01C 23/185 280/32.7 |
| 5,810,371 | A | 9/1998 | Velke | |
| 5,882,020 | A | 3/1999 | Velke | |
| 5,913,802 | A * | 6/1999 | Mullet | A01D 34/6806 180/19.3 |
| 5,947,490 | A * | 9/1999 | Munnoch | A47L 11/4061 15/340.2 |
| 6,000,705 | A | 12/1999 | Velke | |
| 6,145,855 | A * | 11/2000 | Bellis, Jr. | B62D 49/065 280/32.7 |
| 6,234,495 | B1 | 5/2001 | Velke | |
| 6,490,849 | B1 | 12/2002 | Scag et al. | |
| 6,497,422 | B1 * | 12/2002 | Bellis, Jr. | B62D 49/065 280/32.7 |
| 6,523,336 | B2 * | 2/2003 | Starr | A01D 34/475 56/156 |
| 6,629,333 | B2 * | 10/2003 | Bolden | A47L 7/0028 15/383 |
| 6,935,446 | B2 * | 8/2005 | Walker | A01D 51/02 180/19.1 |
| 7,478,689 | B1 * | 1/2009 | Sugden | A01D 34/67 180/19.3 |
| 7,624,996 | B2 * | 12/2009 | Velke | A01D 34/82 280/32.7 |
| 7,954,573 | B2 * | 6/2011 | Jessen | B60F 3/0007 180/6.32 |
| 8,091,672 | B2 | 1/2012 | Gutsch et al. | |
| 8,113,306 | B2 * | 2/2012 | Mass | A01B 33/028 180/19.1 |
| 8,302,240 | B2 * | 11/2012 | Tucker | A47L 11/30 15/49.1 |
| 8,365,850 | B2 * | 2/2013 | Gal | B62B 5/0026 180/65.1 |
| 8,887,841 | B2 | 11/2014 | Oswald et al. | |
| 9,066,468 | B2 * | 6/2015 | Zwieg | A01D 34/64 |
| 9,216,764 | B2 | 12/2015 | Ito et al. | |
| 9,623,903 | B2 | 4/2017 | Cook et al. | |
| 2005/0097875 | A1 * | 5/2005 | Haeufele | A01D 34/824 56/17.5 |
| 2008/0116013 | A1 * | 5/2008 | Vandewinckel | B62D 51/02 187/229 |
| 2009/0182470 | A1 | 7/2009 | Garvey et al. | |
| 2014/0208709 | A1 * | 7/2014 | Helin | A01D 34/69 |
| 2014/0360740 | A1 * | 12/2014 | Strange | A01D 34/824 172/42 |
| 2016/0316615 | A1 | 11/2016 | Papke | |
| 2018/0346007 | A1 * | 12/2018 | Fielder | B62D 51/005 |

OTHER PUBLICATIONS

International Search Report and Written Opinion, PCT/US2017/046092, dated Dec. 1, 2017.
Mower Sulky, Owners Manual, by Havener Enterprises, Inc., Illustrated Parts List.
Mower Sulky, Use and Care Manual, by Havener Enterprises, Inc., Installation and Maintenance.

* cited by examiner

UTILITY MACHINE OPERABLE IN STAND-ON AND WALK-BEHIND MODES

This application claims priority to U.S. Provisional Patent Application No. 62/372,423 filed Aug. 9, 2016, the entire contents of which are incorporated herein by reference.

BACKGROUND

The present invention relates to a utility machine, such as an outdoor power equipment unit such as a lawn mower, operable in stand-on and walk-behind modes. Although stand-on lawn mowers and other outdoor power equipment units are known, they are not normally configured to permit the operator to seamlessly step off the operator platform for walk-behind operation and then step back onto the operator platform to resume stand-on operation.

SUMMARY

In one aspect, the invention provides a utility machine for use by an operator in a standing mode in which the operator rides the machine in a standing position and a walking mode in which the operator walks behind the machine, the utility machine comprising: a machine frame; a prime mover supported by the machine frame; a tractive element supporting the machine frame with respect to a ground surface, the tractive element being operable under the influence of the prime mover to move the utility machine over the ground surface; a work unit supported by the machine frame and configured to perform work under the influence of the prime mover; an operator platform adapted to support the operator in the standing mode, the operator platform being in a deployed condition in both the standing mode and walking mode; a platform connector interconnecting the operator platform with the machine frame; an operator interface enabling an operator of the utility machine to control at least one operational aspect of the prime mover, the tractive element, or the work unit, the operator interface including a hand control adapted to be manipulated by the operator's hand; and an interface support assembly interconnecting the operator interface with the platform connector, the interface support assembly being movable with respect to the platform connector to position the operator interface in a first position in which the hand control is accessible by the operator in the standing mode and a second position in which the hand control is positioned rearward of the operator platform and is accessible by the operator in the walking mode, the interface support assembly maintaining the operator interface in a substantially constant attitude to provide constant control of the utility machine in the standing mode, walking mode, and during operator transition between the standing mode and walking mode.

In some aspects of the invention, the prime mover comprises an internal combustion engine or an electric motor. In some aspects of the invention, the tractive element comprises left and right drive wheels or left and right track drives. In some aspects of the invention, the work unit includes a mower deck assembly including a blade rotating under the influence of the prime mover to cut grass. In some aspects of the invention, the operator platform includes a platform support wheel supporting the operator platform with respect to the ground surface, the platform support wheel rolling over the ground surface in response to movement of the utility machine. In some aspects of the invention, the utility machine further comprises a machine support wheel supporting a portion of the weight of the machine frame and passively rolling over the ground surface in response to movement of the utility machine; wherein the platform connector is connected to the machine frame between the tractive element and the machine support wheel such that at least a portion of the weight of the operator is borne by both the tractive element and the machine support wheel. In some aspects of the invention, the platform connector is connected to the operator platform by way of a pivot joint having a vertical yaw axis. In some aspects of the invention, the platform connector is yoke shaped with first and second arms on opposite sides of the machine frame, and wherein the first and second arms are connected to the machine frame through horizontal platform mounting axles defining a pitch axis about which the operator platform pivots with respect to the machine frame. In some aspects of the invention, the tractive element includes a tractive element on each of opposite sides of the machine frame, the utility machine further comprising a brake-assisted steering system which applies a braking force to the tractive element on an inside radius of a turn in response to applying forces to the hand controls. In some aspects of the invention, manipulation of the hand control controls a speed and direction of operation of the tractive element. In some aspects of the invention, the hand control is positioned at least nine inches behind the operator platform in the walking mode. In some aspects of the invention, the hand control is positioned nine to twelve inches behind the operator platform in the walking mode. In some embodiments: the interface support assembly includes a pair of A-frame steering elements and an interface receiver to which the operator interface is mounted; each A-frame steering element includes an upper portion pivotally interconnected to the interface receiver; each A-frame steering element includes left and right legs extending down from the upper portion to pivotally interconnect to respective left and right sides of the platform connector; and each A-frame steering element occupies a plane generally parallel to the plane of the other A-frame steering element.

In another aspect, the invention provides a lawn mower comprising: a mower assembly including: a mower frame; a prime mover supported by the mower frame; a mower deck assembly supported by the mower frame and operable to cut grass under the mower deck under the influence of the prime mover; a tractive element supporting the mower frame with respect to a ground surface, the tractive element being operable under the influence of the prime mover to move the lawn mower over the ground surface; a mower support wheel supporting the mower frame with respect to the ground surface and passively rolling over the ground surface in response to movement of the mower assembly, the tractive element and mower support wheel together supporting the mower assembly in an operative condition for cutting grass; and a trailer assembly including: an operator platform in a deployed condition for supporting a standing operator for operation of the lawn mower in a standing mode; a platform support wheel supporting the operator platform with respect to the ground surface, the platform support wheel rolling over the ground surface in response to movement of the mower assembly; a platform connector interconnecting the operator platform with the mower frame such that the operator platform is towed behind the mower assembly; an operator interface including a hand control adapted to be manipulated by the operator's hand to control at least one operational aspect of the prime mover, the mower deck assembly, or the tractive element; an interface support assembly interconnecting the operator interface with the platform connector, the interface support assembly being pivotable between a first position in which the hand control is accessible by the operator in the standing mode and a second position in which the hand control is positioned rearward of the operator platform and accessible by the operator in a walking mode in which the operator walks behind the operator platform with the operator platform in the deployed condition.

In another aspect, the invention provides a lawn mower comprising: a frame having a first portion and a second portion; a prime mover supported by the frame and including an output shaft; a tractive element supporting the first portion of the frame and operable under the influence of the prime mover to move the lawn mower over the ground surface; a support wheel supporting the second portion of the frame and passively rolling over the ground in response to movement of the lawn mower; a deck supported by the frame; a spindle supported for rotation with respect to the deck and coupled to the output shaft of the prime mover for rotation in response to rotation of the output shaft; a blade coupled to the spindle for rotation with the spindle to cut grass under the deck, the blade rotating in a cutting plane; a height-of-cut adjustment mechanism enabling adjustment of a height of the first portion or second portion of the frame with respect to the ground; and a cutting plane adjustment mechanism to adjust the cutting plane with respect to the frame to make the cutting plane substantially parallel to the ground.

In some aspects of the invention, the first portion of the frame is a rear portion and the second portion of the frame is a front portion. In some aspects of the invention, the tractive element includes a pair of drive wheels or a pair of track drives. In some aspects of the invention, the support wheel includes a pair of casters. In some aspects, the lawn mower further comprises: an output sheave mounted to the output shaft for rotation with the output shaft; an input sheave mounted to the spindle for rotation with the spindle; and a belt coupling the output sheave and input sheave to transfer rotation of the output shaft to the spindle to rotate the spindle. In some aspects of the invention, a center of rotation of the output sheave and a center of rotation of the input sheave are space no more than sixteen inches. In some aspects of the invention, the output shaft rotates about an output shaft axis of rotation and the input shaft rotates about an input shaft axis of rotation; and the cutting plane adjustment mechanism adjusts the input shaft axis to be non-parallel with respect to the output shaft axis. In some aspects of the invention, the cutting plane adjustment mechanism adjusts an angle of the deck with respect to the frame to cause the input shaft axis angle to be non-parallel with respect to the output shaft axis. In some aspects of the invention, a range of motion of the cutting plane adjustment mechanism includes moving the input shaft axis within five degrees of parallel with respect to the output shaft axis. In some aspects of the invention, the height-of-cut adjustment mechanism includes a removable connector between the frame and the support wheel, the removable connector securing the second portion of the frame at a desired height with respect to the support wheel. In some aspects of the invention: the support wheel comprises left and right caster wheels each having first and second brackets; the height-of-cut adjustment mechanism including a coupling mechanism selectively decoupling the first and second brackets of the left and right caster wheels to permit adjustment of the height of the second end of the frame with respect to the caster wheels, and selectively coupling the first and second brackets of the left and right caster wheels to hold the second end of the frame at a desired height; and the cutting plane adjustment mechanism includes a cutting plane adjustment actuator actuable by the operator to pivot the deck with respect to the frame about the deck pitch axis in response to actuation of the cutting plane adjustment actuator. In some aspects of the invention, the cutting plane adjustment mechanism includes: a cutting plane adjustment actuator pivotably mounted to the frame and manually actuable by the operator; and a cutting plane adjustment cam and pitch adjustment link pivoting the deck with respect to the frame about the deck pitch axis in response to actuation of the cutting plane adjustment actuator.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Spatial terminology (e.g., "front," "rear," "left," "right," "forward," "back," "up," "down," and similar terms) will be used with respect to an ordinary operational condition of the invention from the point of view of an operator.

Figure 1:
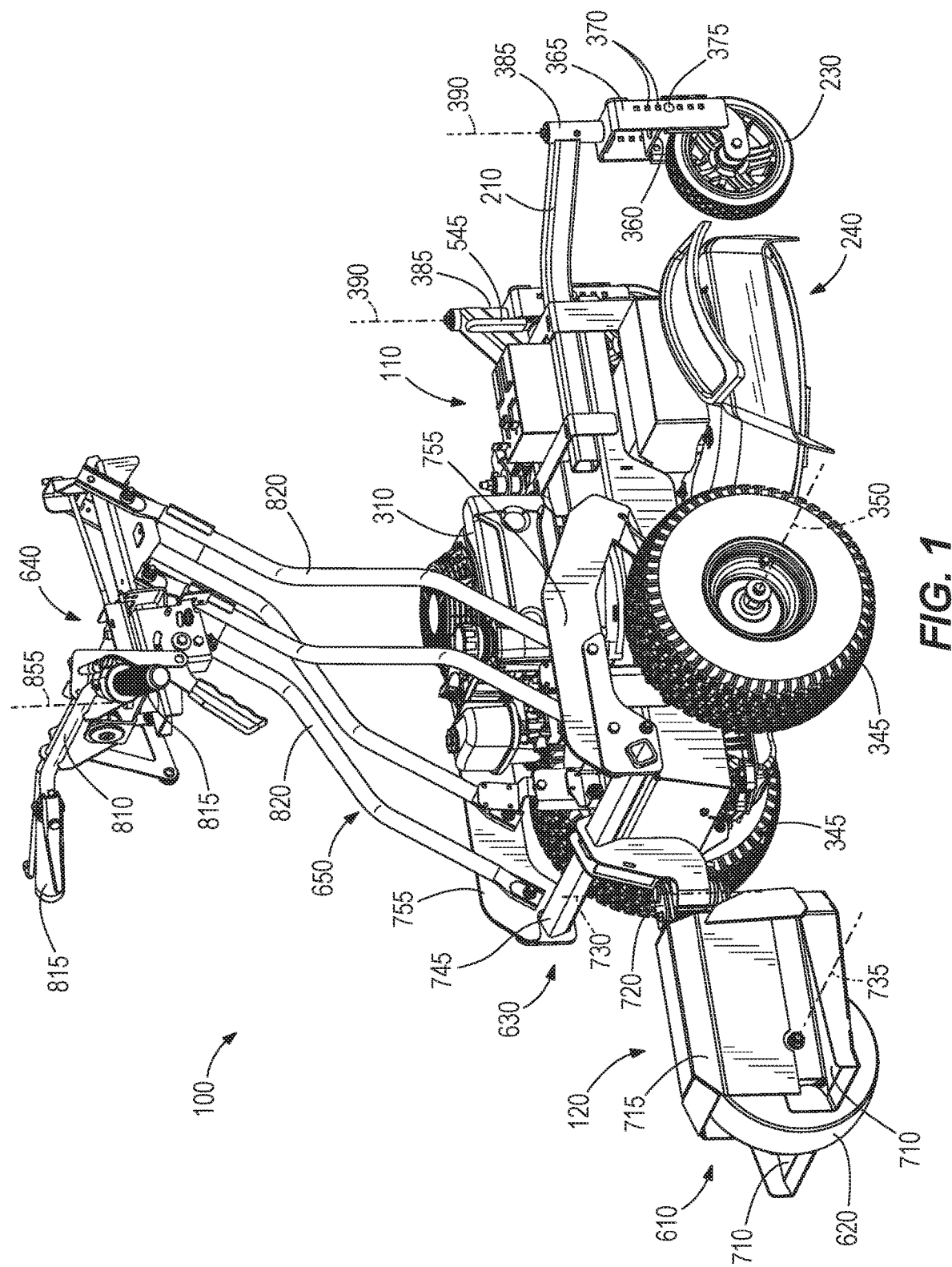
FIG. 1 is a rear perspective view of a utility machine in the form of a lawn mower according to the present invention.
Figure 2:
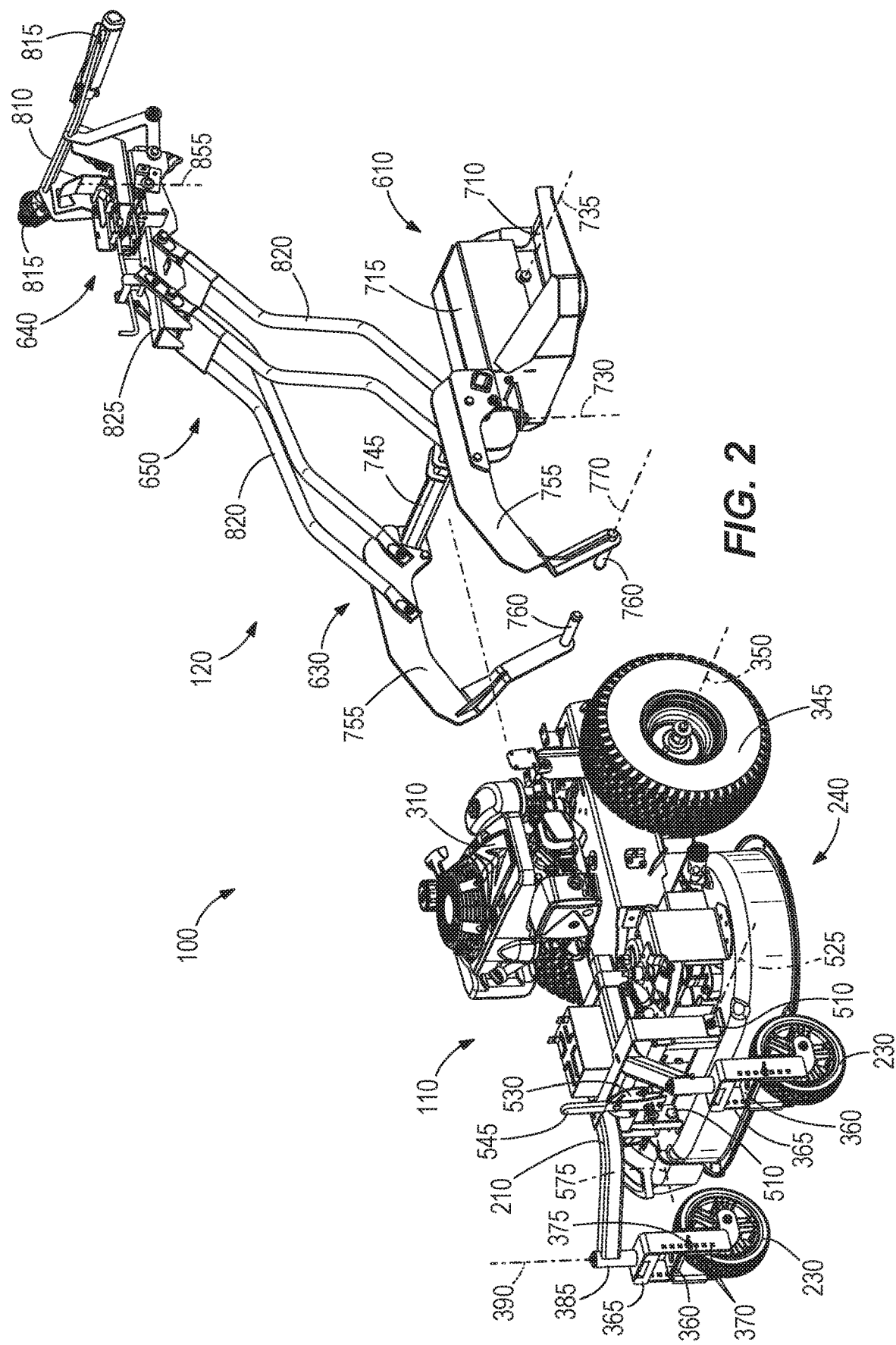
FIG. 2 is an exploded view of the major subassemblies of the lawn mower.

FIGS. 1-2 illustrate an exemplary embodiment of a utility machine according to the present invention. In the illustrated embodiment, the utility machine is in the form of an outdoor power equipment unit and more specifically a lawn mower 100. Although the present invention is described with respect to the illustrated lawn mower 100, it will be understood that the invention is applicable to other outdoor power equipment units and more broadly to utility machines that can be used indoors or outdoors to perform work. As such, aspects of the invention which are described as being part of the lawn mower or "mower" will be understood to be applicable to utility machines generally and the term "machine" can be substituted to for "lawn mower" and "mower" as the case may be (e.g., "mower frame" and "mower support wheels" can be also read as "machine frame" and "machine support wheels"). Generally speaking, utility machines of the type covered by the present invention include a work unit, which encompasses any implement on such utility machine that performs work other than moving the utility machine (e.g., driving rotation of wheels or track drives). In the illustrated and described lawn mower 100 example, the work unit is a mower deck assembly which cuts grass and is in addition to a drive assembly which provides motive power to the lawn mower (moves the lawn mower over a ground surface G). Other types of work units could include leaf blowers, snow blowers, power brush implements, trimmers, tillers, multi-attachment vehicles and other outdoor work units for example and without limiting the scope of the invention, in addition to work units for indoor use such as floor polishers, vacuum cleaners, wet vacs, concrete trowels for example and without limiting the scope of the invention.

The major subassemblies of the lawn mower 100 are the mower assembly 110 and a trailer assembly 120. As will be discussed in more detail below, the mower assembly 110 includes a drive assembly for moving the mower assembly 110 over a ground surface G (FIGS. 6 and 7) and a mower deck assembly for cutting grass. The trailer assembly 120 is passively towed behind the mower assembly 110. The lawn mower 100 is operable in a stand-on mode in which the operator rides on the trailer assembly 120 in a standing position, and a walk-behind mode in which the operator walks behind the trailer assembly 120. In both modes, the trailer assembly 120 is in the illustrated deployed condition, meaning that the operator does not need to disconnect or stow the trailer assembly 120 when operating in walk-behind mode. This configuration enables the operator to move fluidly between the stand-on and walk-behind modes without interruption of operation and control of the lawn mower 100.

Figure 3:
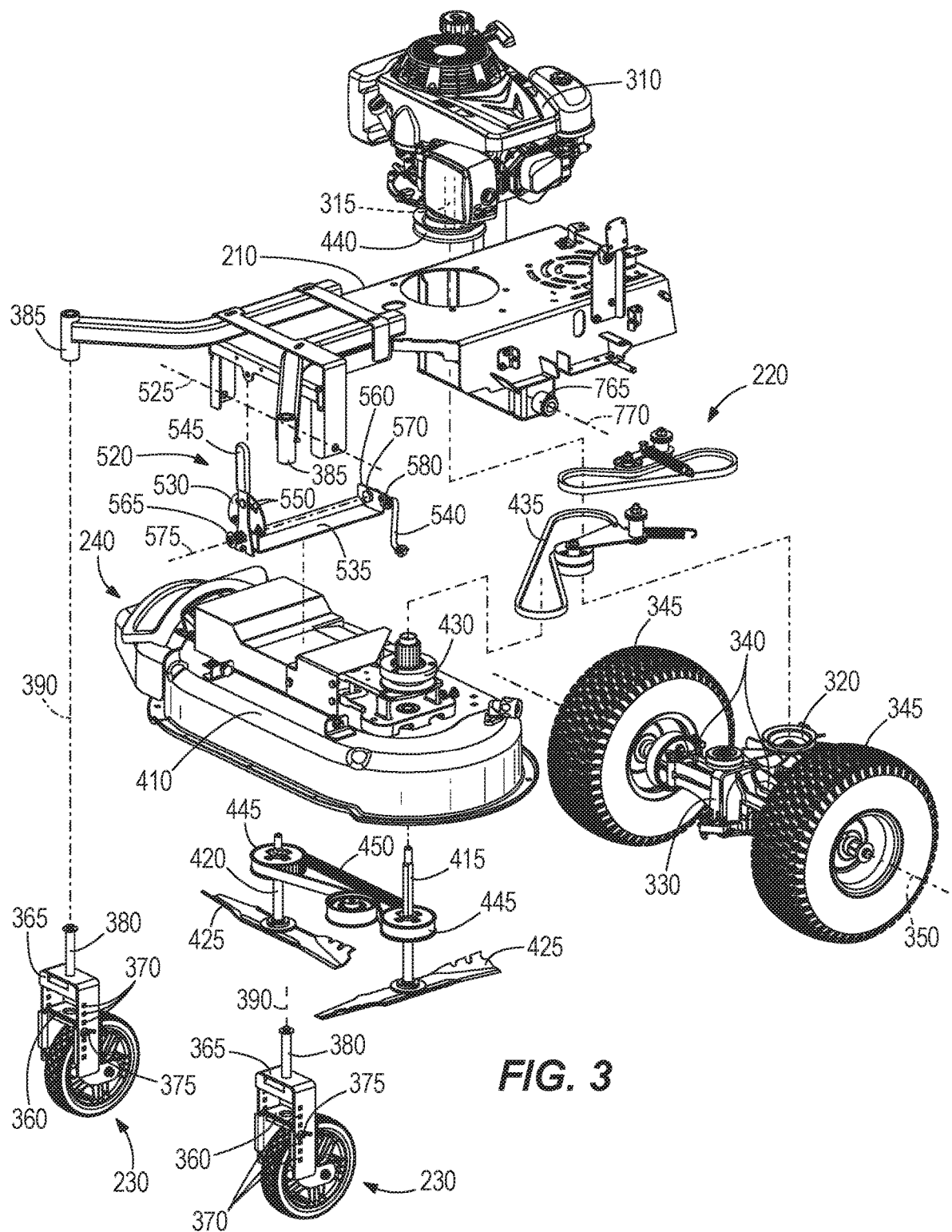
FIG. 3 is an enlarged exploded view of the lawn mower assembly.

With reference to FIG. 3, the mower assembly 110 includes a mower frame 210, a drive assembly 220, mower support wheels 230, and a mower deck assembly 240.

The drive assembly 220 includes an internal combustion engine 310 mounted to the mower frame 210. The internal combustion engine 310 includes a rotating output shaft or power takeoff shaft (PTO) 315 that drives a hydraulic system 320 which includes a hydraulic pump and a hydraulic motor. The hydraulic system 320 applies torque to a power differential 330, which distributes the torque to drive shafts 340 connected to drive wheels 345. In the illustrated embodiment there are left and right drive shafts 340 and drive wheels 345 on the respective left and right sides of the rear of the mower assembly 110. The drive wheels 345 support the mower frame 210 and rotate under the influence of the internal combustion engine 310 (through the hydraulic system 320, differential 330, and drive shafts 340) to move the mower assembly 110 across the ground surface G.

In other embodiments of the invention, the internal combustion engine 310 can be replaced with an electric motor or any other suitable prime mover (e.g., a hybrid gas/electric motor, a fuel cell, or any other suitable device operating on a suitable fuel). If a prime mover capable of modulating speed is employed (e.g., an electric motor), the hydraulic system 320 (hydraulic pump and hydraulic motor) can be dispensed with and the primary mover can provide power directly to the differential 330. In other embodiments the drive wheels 345 could be replaced with track drives or any other suitable tractive elements. The left and right drive shafts 340 are coaxial about a drive axis 350 and can collectively be referred to as the drive shaft of the mower assembly 110.

The mower support wheels 230 passively roll over the ground surface in response to movement of the mower assembly 110. The mower support wheels 230 include left and right support wheels on respective left and right sides of the front of the mower frame 210. In the illustrated embodiment, each mower support wheel 230 is a caster having a first bracket 360 and a second bracket 365. The second bracket 365 fits around the outside of the first bracket 360 and includes a plurality of vertically-spaced holes 370. A pin 375 (or coupling mechanism) extends through a selected hole in the second bracket 365 and a hole in the first bracket 360 to couple the first and second brackets 360, 365. This configuration permits adjustment of the front of the mower frame 210 with respect to the ground surface G (FIG. 6) by removing the pin 375, registering a different hole 370 in the second bracket 365 with the hole in the first bracket 360 and inserting the pin 375 into the new set of aligned holes. The second bracket 365 includes a vertical support post 380 that is received in a vertical support bearing 385 in the mower frame 210, such that the caster can swivel about a vertical support axis 390 defined by the support post. The drive wheels 345 and mower support wheels 230 together support the mower assembly 110 in an operative condition for cutting grass. The mower assembly 110 is self-supporting on the drive wheels 345 and mower support wheels 230, without the assistance of the trailer assembly 120.

The mower deck assembly 240 includes a mower deck 410, an input spindle 415 supported by bearings for rotation relative to the mower deck 410, a passive spindle 420 also supported by bearings for rotation relative to the mower deck 410, and a cutting blade 425 on a bottom end of each of the input spindle 415 and passive spindle 420. Although not included in the illustrated embodiment, the mower deck 410 may include anti-scalp wheels that engage the ground during relatively abrupt changes in terrain to temporarily deflect/raise the mower deck 410. In a neutral position, the input spindle 415 and passive spindle 420 are vertically disposed (i.e., rotate about vertical longitudinal axes) and the cutting blades 425 are horizontally disposed (i.e., rotate and cut grass in a horizontal plane). An input sheave 430 is mounted to the input spindle 415 and is coupled with a drive belt 435 to an output sheave 440 on the PTO 315, such that rotation of the PTO 315 is transferred to the input spindle 415 through the input sheave 430. In the neutral position, the input sheave 430, drive belt 435, and output sheave 440 are generally coplanar. The spacing between the vertical axes of the input spindle 415 and PTO 315 (i.e., the spacing between the input sheave 430 and output sheave 440) is about sixteen inches (16") in the neutral position of the illustrated embodiment.

Timing sheaves 445 are mounted to the input spindle 415 and the passive spindle 420 under the mower deck 410 and connected with a timing belt 450 so that rotation of the cutting blades 425 by the input spindle 415 and passive spindle 420 is synchronized and powered by the internal combustion engine 310. In other constructions the mower deck assembly 240 may include a single cutting blade 425 (i.e., just the input spindle 415 with no passive spindles 420) or more than two cutting blades 425 (i.e., with additional passive spindles 420).

Turning to FIGS. 4-7 the mower deck assembly 240 is mounted to the mower frame 210 through a pair of pivot mounts 510 and a deck pitch adjustment assembly 520. The pivot mounts 510 in the illustrated embodiment are a pair of pins, shoulder bolts, or the like which extend horizontally through the mower deck 410 and the mower frame 210. In the illustrated embodiment, the pivot mounts 510 connect a front end of the mower deck 410 to a front portion of the mower frame 210. The pivot mounts 510 are aligned to define a horizontal deck pivot axis 525 extending side-to-side (i.e., left and right) across the mower frame 210 and mower deck 410.

The deck pitch adjustment assembly 520 includes a pitch adjustment plate 530, a pitch adjustment cam 535, a pitch adjustment link 540, and a pitch adjustment lever 545. The pitch adjustment plate 530 is rigidly mounted to the front portion of the mower frame 210. The pitch adjustment plate 530 includes a plurality of pitch setting holes 550. The pitch adjustment cam 535 includes a first end flange 555 and a second end flange 560 at respective first and second opposite ends of the pitch adjustment cam 535.

A first pitch adjustment mount 565 extends through the pitch adjustment lever 545, first end flange 555 of the pitch adjustment cam 535, the bottom of the pitch adjustment plate 530, and the mower frame 210 to pivotally mount the pitch adjustment lever 545 and pitch adjustment cam 535 with respect to the pitch adjustment plate 530 and mower frame 210. The pitch adjustment cam 535 extends rearward from the pitch adjustment plate 530. The second end flange 560 of the pitch adjustment cam 535 is pivotally mounted to the mower frame 210 with a second pitch adjustment mount 570. The first and second pitch adjustment mounts 565, 570 in the illustrated embodiment are a pair of pins, shoulder bolts, or the like that are aligned to define a horizontal pitch adjustment axis 575 that extends along a length of the mower deck 410 (i.e., front to rear, perpendicular to the horizontal deck pivot axis 525). The pitch adjustment cam 535 extends parallel to the pitch adjustment axis 575. The second end flange 560 of the pitch adjustment cam 535 includes a cam arm 580 extending away from the pitch adjustment axis 575 to act as an actuation arm for the pitch adjustment link 540.

A top end of the pitch adjustment link 540 is attached to the cam arm 580 at a point spaced from the pitch adjustment axis 575. A bottom end of the pitch adjustment link 540 is connected to a rear portion of the mower deck 410, such that pivoting of the pitch adjustment cam 535 causes the rear of the mower deck 410 to raise and lower through the pitch adjustment link 540, resulting in the deck pivoting about the horizontal deck pivot axis 525.

The pitch adjustment lever 545 includes a projection 585 that is received in a selected pitch setting hole 550 in the pitch adjustment plate 530 to set the pitch angle of the mower deck 410 (i.e., the angle relative to horizontal at which the deck 410 extends rearwardly and up or down from the horizontal deck pivot axis 525). The first pitch adjustment mount 565 is surrounded by a compression spring 590 that is captured between a forward-facing surface of the pitch adjustment lever 545 and a washer or head at the end of the first pitch adjustment mount 565. The compression spring 590 holds the pitch adjustment lever 545 against the pitch adjustment plate 530 to keep the projection 585 in the selected pitch setting hole. The spring permits the pitch adjustment lever 545 to be tilted away from the pitch adjustment plate 530 to remove the projection 585 from the pitch setting hole 550 so that the pitch adjustment lever 545 can be pivoted to insert the projection 585 into a new pitch setting hole 550.

Figure 4:
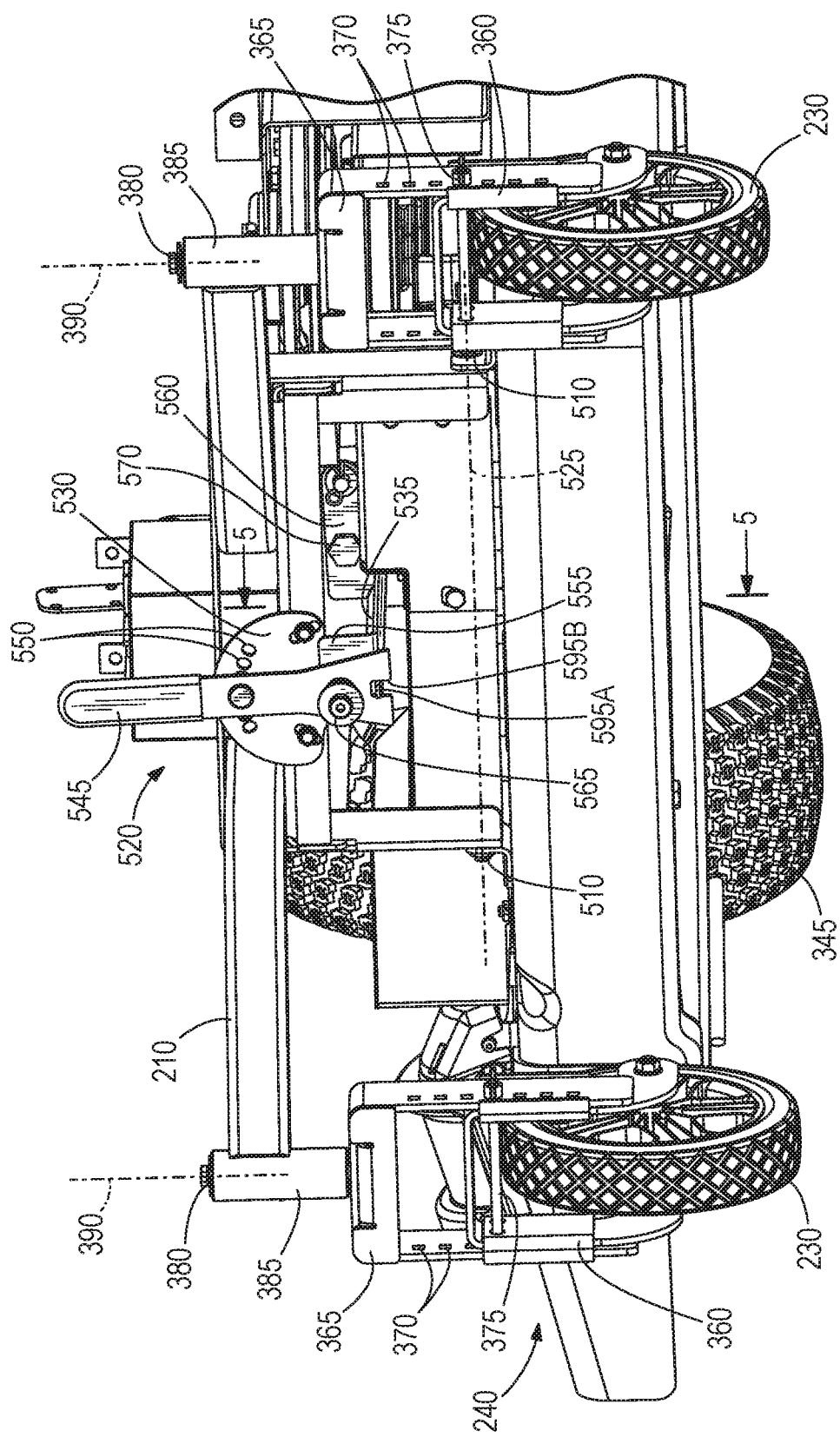
FIG. 4 is a front perspective view of a height-of-cut adjustment mechanism.
Figure 5:
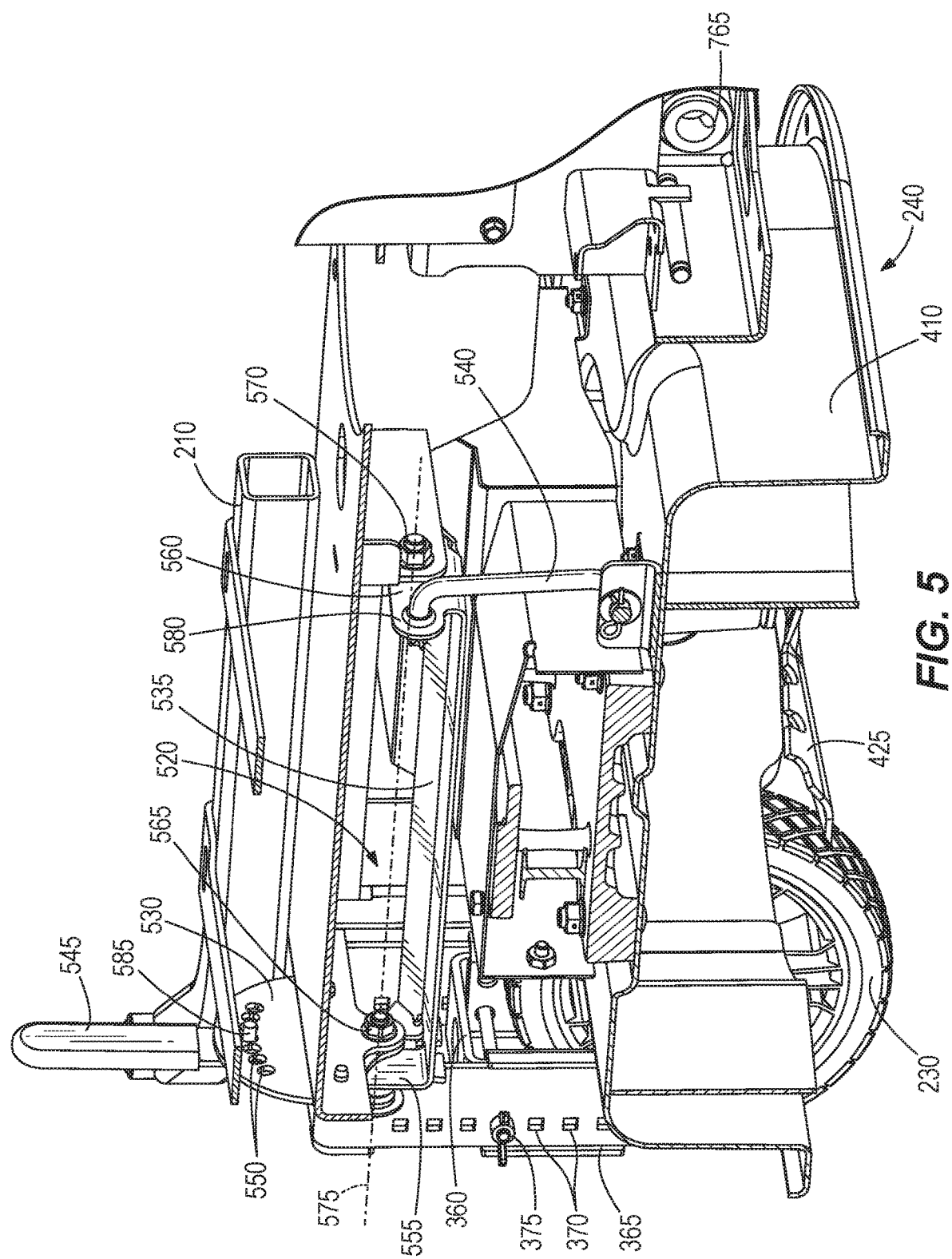
FIG. 5 is a rear perspective cross-section view of the height-of-cut adjustment mechanism taken along line 5-5 in FIG. 4.

The pitch adjustment cam 535 is coupled with the pitch adjustment lever 545 for rotation together about the pitch adjustment axis 575. More specifically, as seen in FIG. 4, the pitch adjustment cam 535 of the illustrated embodiment includes a tab 595A that extends into a slot 595B in the bottom of the pitch adjustment lever 545. Consequently, pivoting the pitch adjustment lever 545 about the pitch adjustment axis 575 causes the mower deck 410 to pivot about the deck pivot axis 525 and the mower deck 410 may be held in a desired pitch angle by inserting the projection 585 into one of the pitch setting holes 550. In the illustrated construction, the pitch adjustment lever 545 can adjust the pitch of the mower deck 410 an angle $\alpha$ (FIGS. 6 and 7) up to about five degrees (5°) in either direction (i.e., pivoting up and down) from neutral (i.e., the middle pitch setting hole 550) and can thus adjust the angle of the input spindle 415 and passive spindle 420 (and other components such as the mower blades 425) the same angle $\alpha$ in response to adjustment of the mower frame 210 to make the input spindle 415 vertical (FIG. 7).

Figure 6:
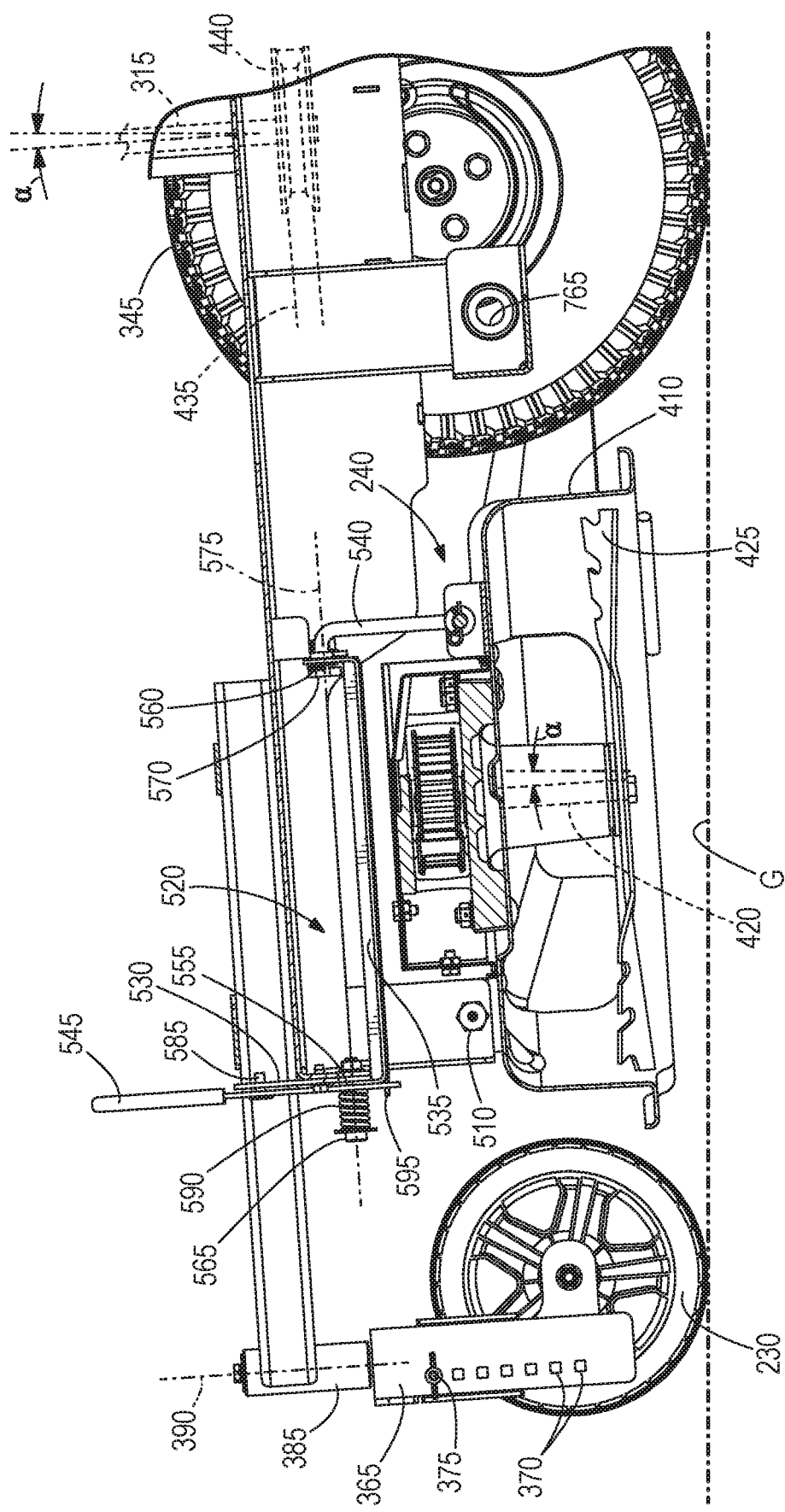
FIG. 6 is a side view of the height-of-cut adjustment mechanism after a first step in adjustment.
Figure 7:
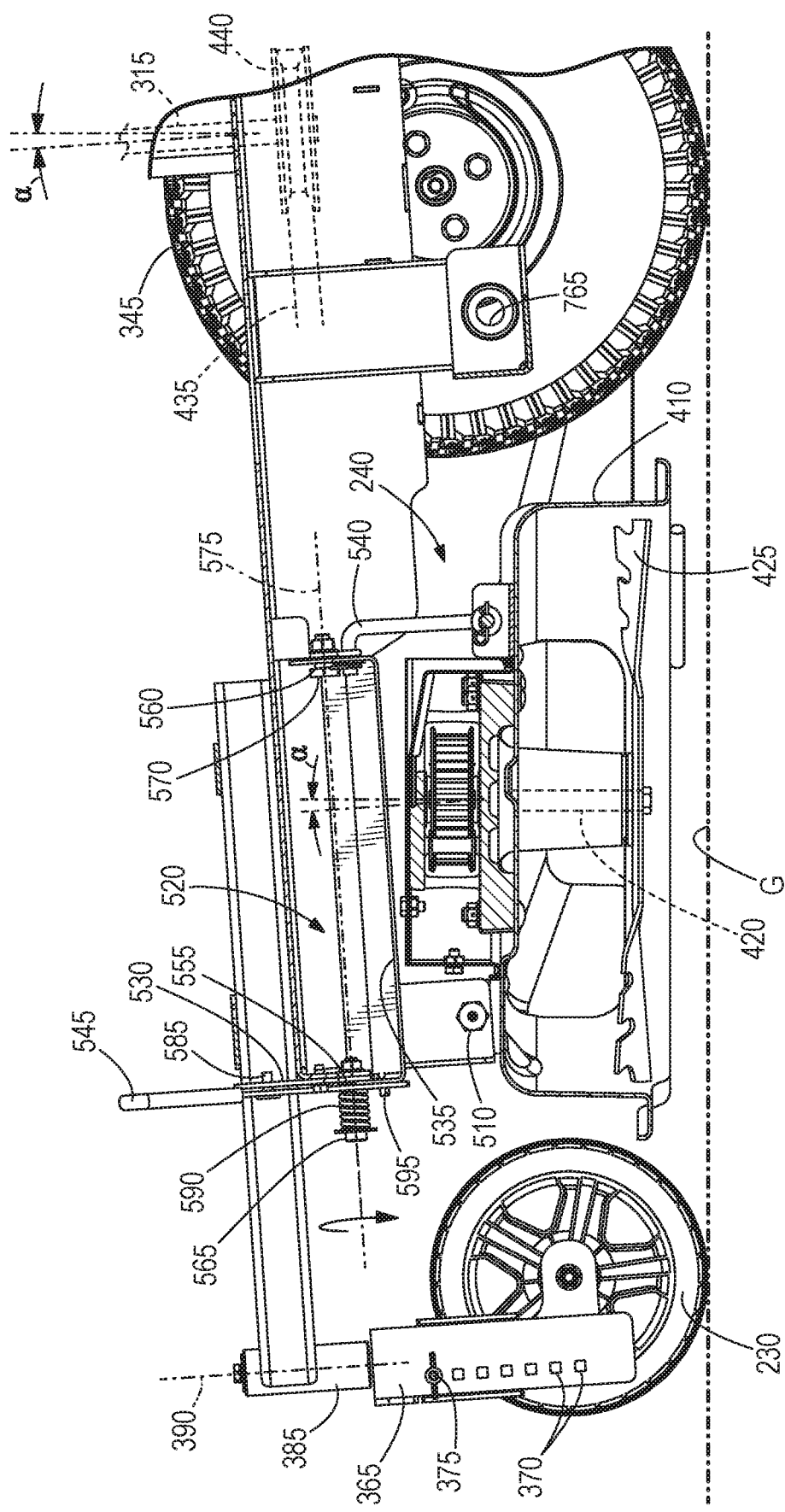
FIG. 7 is a side view of the height-of-cut adjustment mechanism after a second step in adjustment.

As illustrated in FIGS. 6-7, height of cut for the mower assembly 110 is accomplished in a two-step process. First, as illustrated in FIG. 6, the front portion of the mower frame 210 is raised or lowered with respect to the mower support wheels 230 using the pins 375 and holes 370 in the second brackets 365 of the mower support wheels 230. This causes the coplanar input sheave 430, drive belt 435, and output sheave 440 to pitch up or down from horizontal, and causes the cutting plane of the cutting blades 425 to also pitch up or down. In the illustrated example, the front portion of the mower frame 210 is lowered the maximum amount, which results in the PTO 315, the input spindle 415, the passive spindle 420, and other components such as the cutting blades 425 pivoting an angle $\alpha$ of five degrees (5°) in the example provided.

Second, as illustrated in FIG. 7, the pitch of the mower deck 410 is adjusted with respect to the mower frame 210 via the deck pitch adjustment assembly 520, to bring the cutting plane of the cutting blades 425 back to horizontal (and the spindles 415, 420 back to vertical). More specifically, the pitch adjustment lever 545 is rotated to pivot the pitch adjustment cam 535 and raise or lower the rear end of the mower deck 410. As the rear end of the mower deck 410 raises or lowers, the mower deck 410 pivots about the horizontal deck pivot axis 525, which changes the pitch of the mower deck 410 with respect to the mower frame 210. In alternative configurations, the horizontal deck pivot axis 525 may be provided at a rear end or middle of the mower deck 410 and the deck pitch adjustment assembly 520 may be configured to raise and lower the front end of the mower deck 410.

As the mower deck 410 pitch is adjusted, the input spindle 415 and passive spindle 420 are pivoted into a non-parallel relationship with the PTO 315, and the input sheave 430 is made non-coplanar with respect to the output sheave 440. The range of pivoting of the input spindle 415 and input sheave 430 with respect to the PTO 315 and output sheave 440 (i.e., the angle $\alpha$ which has a maximum of about 5° in this example) is within a range that the drive belt 435 can still effectively transfer rotation from the output sheave 440 to the input sheave 430.

Figure 8:
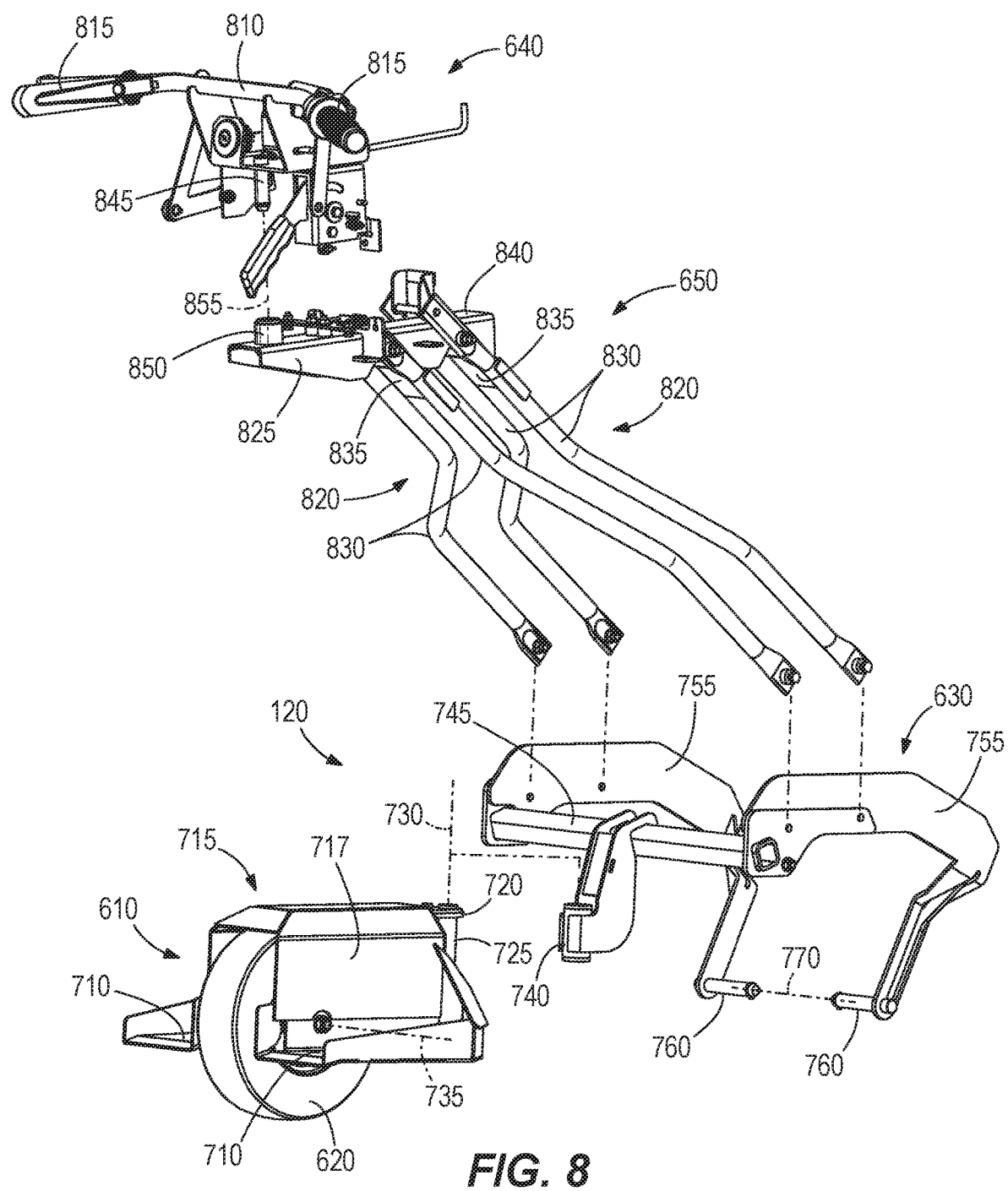
FIG. 8 is an enlarged exploded view of the trailer assembly.
Figure 9:
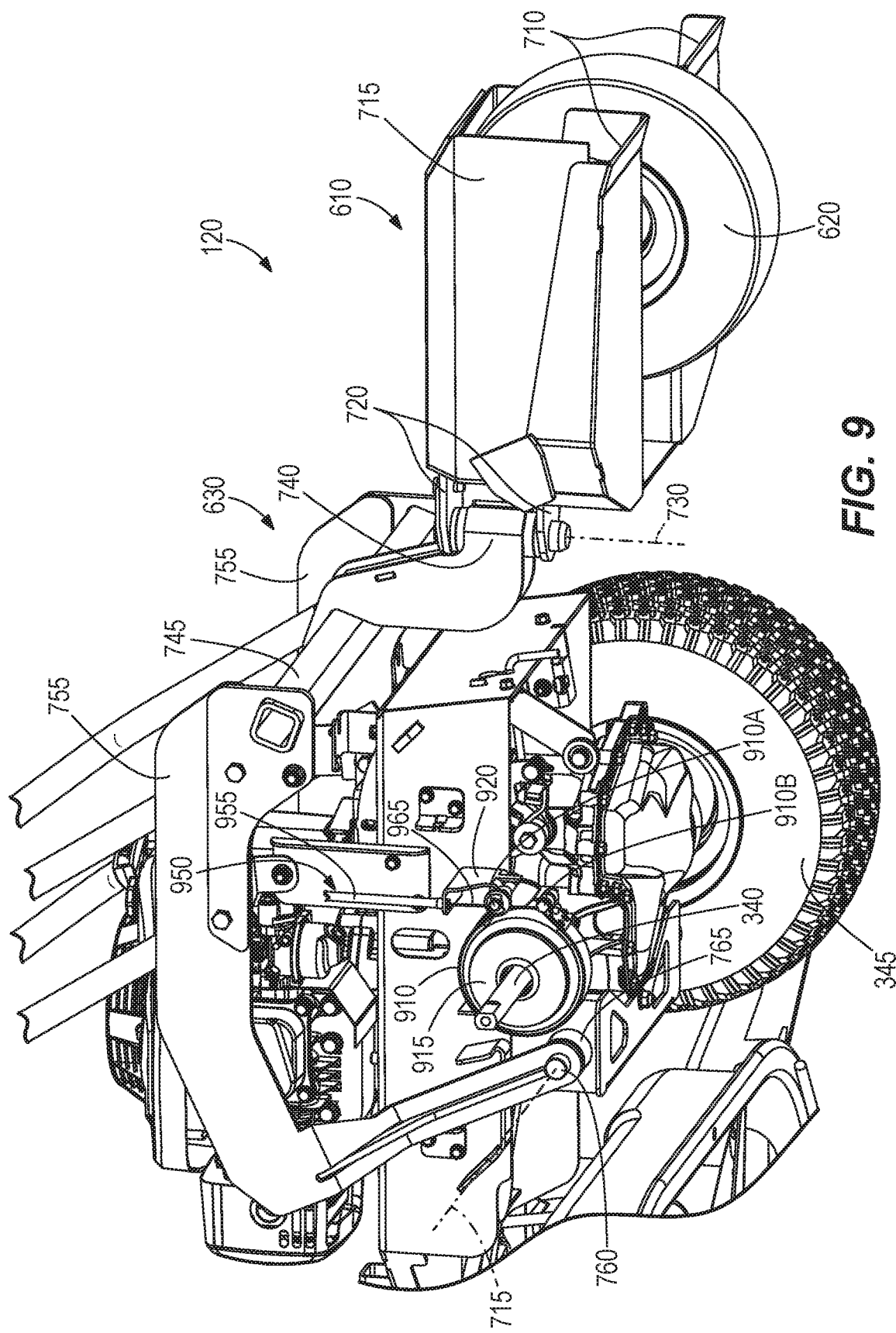
FIG. 9 is bottom perspective view of the connection of the trailer assembly to the mower assembly.

Referring now to FIGS. 8 and 9, the trailer assembly 120 includes an operator platform 610, a platform support wheel 620, a platform connector 630, an operator interface 640, and an interface support assembly 650.

The operator platform 610, which may also be referred to as a sulky, is configured to support an operator in a standing position. The illustrated operator platform 610 includes left and right foot pads 710 to accommodate the respective left and right feet of the operator. The operator platform 610 also includes a wheel well 715 rising up above the foot pads 710, such that the operator's feet are on opposite sides of the wheel well 715. The wheel well 715 includes a chamfer or beveled top 717 to permit the operator additional leg clearance while leaning into turns or leaning uphill when the lawn mower is moving along a side hill. In other constructions, the top 717 of the wheel well 715 may be rounded for a smoother appearance while still providing leg clearance. A pair of flanges 720 (best seen in FIG. 9) at the front of the operator platform 610 support a vertically-oriented yaw pin 725, which defines a vertical trailer yaw axis 730.

The platform support wheel 620 supports the operator platform 610 with respect to the ground surface G and passively rolls over the ground surface G as the trailer assembly 120 is towed behind the mower assembly 110. In the illustrated construction, the platform support wheel 620 is mounted to an axle that is roughly at the level of the foot pads 710 and defines a platform support wheel axis 735. The top half of the platform support wheel 620 rotates in the wheel well 715, between the feet of the operator. Consequently, the operator straddles the single platform support wheel 620 in the illustrated construction. In other constructions, a pair of platform support wheels 620 can be positioned on opposite sides of the operator platform 610 such that the operator's feet are between the pair of wheels 620, without any need for the wheel well 715. The foot pads 710 are slightly below the platform support wheel axis 735 so that the ends of the platform support wheel axle are below the operator's ankle to avoid rubbing. In other constructions, the foot pads 710 can be lowered to lower the center of gravity of the operator, in which case the ends of the platform support wheel axle may be covered with a shroud or second wall for the comfort of the operator.

The platform connector 630 includes a vertical bearing 740 which receives the yaw pin 725 and permits the operator platform 610 to articulate about the trailer yaw axis 730 with respect to the platform connector 630. The platform connector 630 further includes a horizontal crossbar 745 to which the vertical bearing 740 is mounted. The crossbar 745 extends from side-to-side generally above and across the rear end of the mower frame 210. The platform connector 630 further includes a gooseneck 755 rigidly mounted to each end of the crossbar 745 and extending forward above the associated side of the mower frame 210 or drive wheel 345. The goosenecks 755 extend down and rearward near the bottom of the mower frame 210, below the engine and forward of the drive shafts 340, where they connect to the mower frame 210 as described below. The rigid interconnection between the goosenecks 755 and the crossbar 745 is accomplished with a non-round crossbar cross-sectional shape (e.g., a square tube) received in a complimentary opening in the rear end of each gooseneck 755. Each gooseneck 755 may be a single, integral component or may be a composite of multiple components (e.g., metal stampings) rigidly joined with fasteners or welding. In other constructions, the goosenecks 755 and crossbar 745 can be integrally formed of metal tubing bent into the desired shape. The goosenecks 755 may also be called first and second arms or left and right arms. The platform connector 630 may be called yoke shaped with first and second arms 755 on opposite sides of the mower or machine frame 210.

A trailer mounting axle 760 (which may also be called a platform mounting axle) extends horizontally from the lower end of each gooseneck 755 toward the center of the mower frame 210 (i.e., the trailer mounting axles 760 extend toward each other) and are receive in bearings 765 (FIGS. 5-7 and 9). The trailer mounting axles 760 are collinear and together define a horizontal trailer pivot axis or trailer pitch axis 770 about which the trailer assembly 120 can pivot with respect to the mower frame 210 as the mower assembly 110 and trailer assembly 120 move over hilly terrain. The trailer pitch axis 770 permits the trailer assembly 120 to pivot in a pitch sense with respect to the mower assembly 110. Because the goosenecks 755 connect to the mower frame 210 forward of the drive shafts 340, the weight of an operator riding on the operator platform 610 is divided between the platform support wheel 620 and the mower frame 210. The portion of the operator's weight borne by the mower frame 210 is distributed to both the drive wheels 345 and the mower support wheels 230, which is desirable to keep the mower support wheels 230 on the ground surface G. If the operator platform 610 were connected to the mower frame 210 rearward of the drive axles, the portion of the operator's weight transferred to the mower frame 210 may cause a moment about the drive shafts 340 which would tend to lift the mower support wheels 230.

The trailer yaw axis 730 and trailer pitch axis 770 give portions of the trailer assembly 120 two degrees of freedom of movement with respect to the mower assembly 110. The entire trailer assembly 120 (including the operator platform 610, platform support wheel 620, platform connector 630, operator interface 640, and interface support assembly 650) has a degree of freedom about the pitch axis 770 with respect to the mower assembly 110 (including the mower frame 210, drive assembly 220, mower support wheels 230, and mower deck assembly 240). Components of the trailer assembly 120 rearward of the yaw axis 730 (the operator platform 610 and platform support wheel 620) have an additional degree of freedom about the yaw axis with respect to the mower assembly 110 and the trailer assembly components 110 forward of the yaw axis 730 (the platform connector 630, operator interface 640, and interface support assembly 650).

The operator interface 640 includes a generally horizontal handlebar 810 having hand controls 815 at opposite ends (e.g., left and right ends of the handlebar for the respective left and right hands of the operator). The hand controls 815 may include multiple functions that can be manipulated by the operator's hands. Some examples of hand controls 815 include: a mower engagement control for transmitting power from the engine to the input sheave 430 of the mower deck assembly 240, an engine throttle, an engine choke, an engine kill switch, and a hydraulic motor or pump control for controlling the speed and direction of operation of the drive wheels 345. In the illustrated embodiment, the right hand control 815 includes a twist control which manipulates a swash plate in the hydraulic motor for controlling speed and direction of operation of the drive system. In other constructions, the hand controls may include finger controls for manipulating the swash plate for speed and direction control of the drive system.

The interface support assembly 650 includes a pair of parallel A-frame elements 820 and an interface receiver 825. Each A-frame element 820 includes a pair of legs 830 (e.g., left and right legs) that include upper and lower portions (also referred to as the "top" and "bottom" of the legs). The legs 830 of each pair spread apart at the bottom and narrow toward each other at the top. The tops of the legs 830 in each A-frame element 820 are joined with a sleeve 835, which holds the tops of the legs 830 in spaced relationship to accommodate the interface receiver 825. The interface receiver 825 is positioned between the top ends of the A-frame element legs 830 and the top of each leg 830 is pivotably mounted to the interface receiver 825. The bottoms of the legs 830 are pivotably mounted to the goosenecks 755 of the platform connector 630. In this regard, the A-frame elements 820 occupy or are in parallel planes (one generally forward of the other). Another way to characterize the configuration of the interface support assembly 650 is that it includes a four-bar linkage on both sides of the mower frame 210, with the four bars comprising the two left or right legs 830 of the A-frame elements 820, the left or right gooseneck 755, and the interface receiver 825. The four-bar linkage can also be referred to as a quadrilateral or parallelogram configuration.

The interface receiver 825 includes a top surface 840 that is generally horizontal through the entire range of motion of the interface support assembly 650 (i.e., as the interface support assembly 650 pivots about the top and bottom of the legs 830 of the A-frame elements 820). The operator interface 640 is mounted to the interface receiver 825 with a vertical interface post 845 of the operator interface 640 received in a vertical receiver bearing 850 of the interface receiver 825. The operator interface 640 pivots about a vertical interface axis 855 defined by the vertical interface post 845 in the interface receiver 825 bearing within a range of motion of, for example, about three to five degrees (3-5°) from center in both clockwise and counterclockwise directions. In addition to applying a turning moment on the lawn mower 100, this pivoting action actuates steer-assisting brakes as will be discussed in more detail below.

Figure 10:
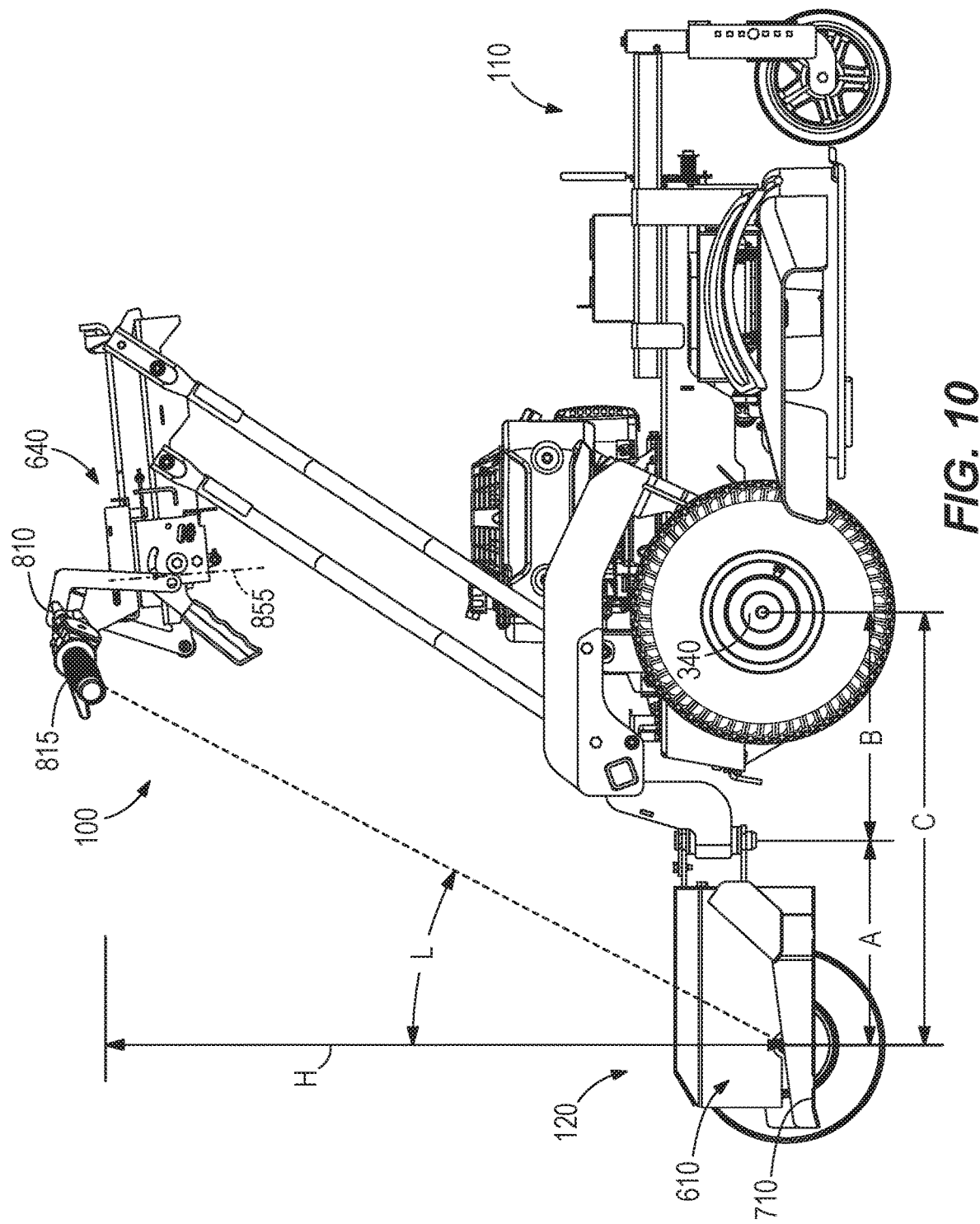
FIG. 10 is a side view of the lawn mower configured for operation in a stand-on mode.
Figure 11:
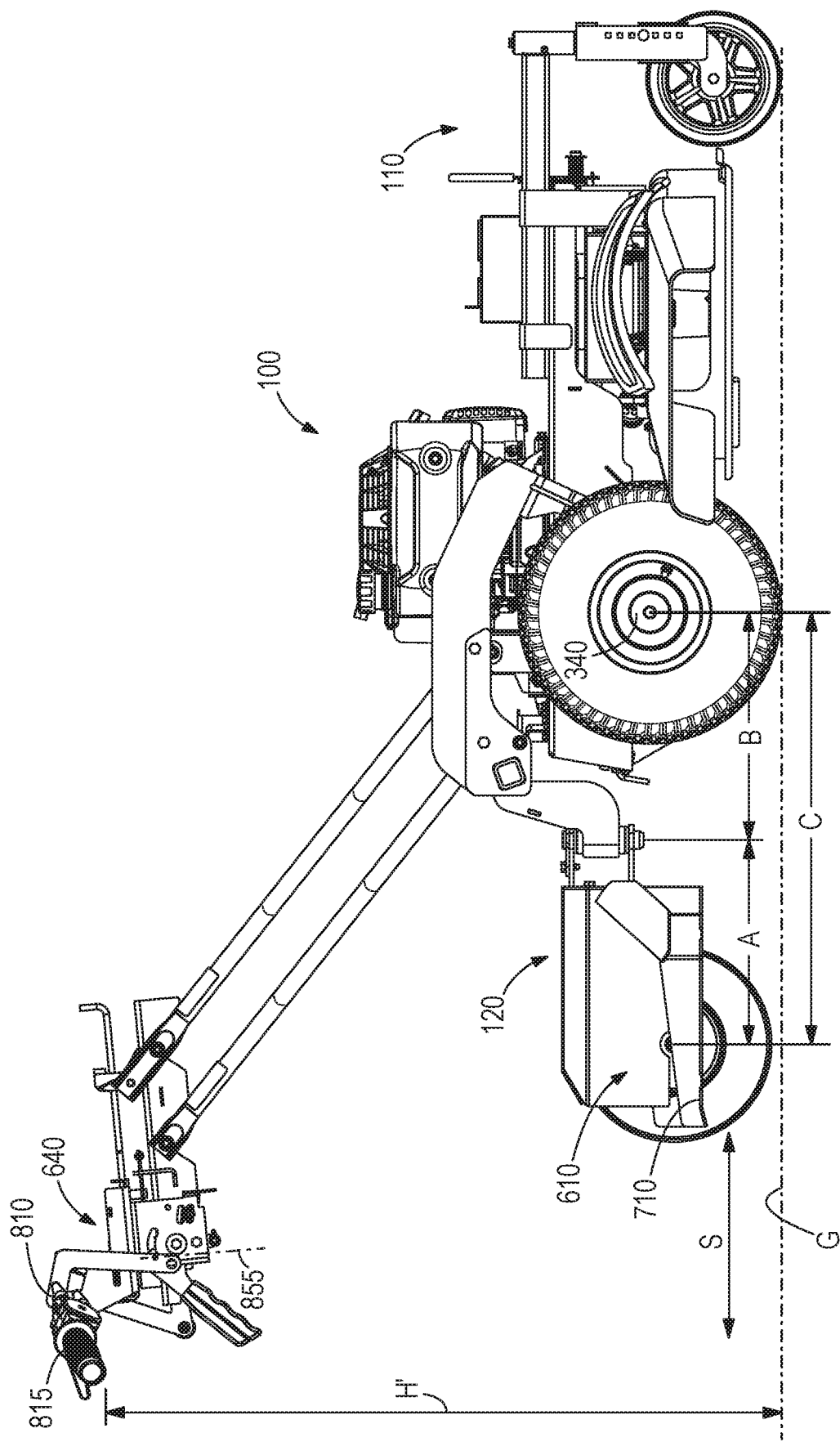
FIG. 11 is a side view of the lawn mower configured for operation in a walk-behind mode.

Referring now to FIGS. 10 and 11, an operator can smoothly move between a stand-on mode (FIG. 10) in which the operator stands on the operator platform 610 and is towed behind the mower assembly 110, and a walk-behind mode (FIG. 11) in which the operator steps back and down off the operator platform 610 and walks behind the operator platform 610. The interface support assembly 650 pivots between a first or "upright" position in stand-on mode (FIG. 10) and a second or "angled" position in walk-behind mode (FIG. 11). A locking mechanism may be used to hold the interface assembly 650 in a desired position such as the upright position, angled position, or multiple positions in between the upright and angled positions. The locking mechanism may include a pin-and-hole configuration between the interface support assembly 650 and another component (e.g., the goosenecks 755) for discrete positions or a friction engagement for infinite adjustability. The interface support assembly 650 may also include biasing members such as springs to bias the interface support assembly 650 to a desired default position (e.g., the upright position) and to assist the operator in raising or lowering the operator interface 640 between the stand-on and walk-behind modes.

The operator interface 640, owing to the four-bar linkage of the interface support, remains in substantially the same attitude (i.e., with the interface axis 855 remaining substantially vertical) in the stand-on mode, walk-behind mode, and during the transition between the modes, which enables the operator to maintain constant control and achieve a fluid transition between the modes without shutting down the lawn mower 100. Also, the operator does not need to reconfigure the lawn mower 100 when moving between the stand-on and walk-behind modes because the operator platform 610 remains in the deployed condition (i.e., in the condition it is in when carrying the operator) in both modes. The operator can easily step onto or off of the operator platform 610 to seamlessly move between the ride-on and walk-behind modes while maintaining uninterrupted operation and control of the mower.

The height H of the operator interface 640 in the stand-on mode (i.e., the center of the hand controls 815 with respect to top surface of the foot pads 710) and the height H' of the operator interface 640 in the walk-behind mode (i.e., the center of the hand controls 815 with respect to the ground surface G) is essentially the same so that the operator's hands are maintained at a substantially constant height relative to the operator's body in both modes. In the illustrated embodiment, the height H and height H' are both about forty to forty-one inches (40-41").

The illustrated construction is characterized by a few additional dimensions which will be discussed below. All dimensions are introduced and discussed with the assumption that the lawn mower 100 is on a flat ground surface G. Some of the dimensions may change as the lawn mower 100 moves over hills and uneven terrain. "A" is the distance between the platform support wheel axis 735 and the trailer yaw axis 730; "B" is the distance between the trailer yaw axis 730 and the drive axis 350, and "C" is the distance between the platform support wheel axis 735 and the drive axis 350. In preferred constructions, dimension A is ten to twelve inches (10-12"), dimension B is between twelve and fourteen inches (12-14"), and dimension C is between twenty-two and twenty-six inches (22-26"). One suggested design parameter is to keep the absolute value of the difference between dimensions A and B below or equal to about four inches (i.e., |A−B|≤4"). In other words, dimension A should not be more than four inches longer or shorter than dimension B. For short, the absolute value of the difference between dimensions A and B can be referred to as the "yaw difference." Another suggested design parameter is to keep the ratio of A to C below or equal to about 0.55 (i.e., A/C≤0.55). in other words, the dimension A should not be more than about fifty-five per cent (55%) of dimension C. This ratio can be referred to as the "yaw ratio." In the illustrated construction, dimension A is 11.38 inches, dimension B is 12.68 inches, dimension C is 24.06 inches, resulting in a yaw difference of 1.30 inches and yaw ratio of 0.47.

When in stand-on mode (FIG. 10), the vertical interface axis 855 intersects or is slightly forward of the drive axis 350 (i.e., the drive shaft 340) and the weight of the operator is leaning slightly forward for stability. The handlebar 810 is forward of the operator a sufficient distance so that the range of pivoting motion of the handlebar 810 is not interrupted by the operator's body. In the illustrated embodiment, a leaning angle L between a vertical plane intersecting the platform support wheel axle and a line between the platform support wheel axle and the center of the hand controls 815 is between twenty-five and thirty degrees (25-30°) and preferably about twenty-eight degrees (28°). The leaning angle L helps the operator move the operator's center of gravity forward when going up a hill. At the same time, the handlebar 810 is close enough to the operator so that the operator can comfortably grasp the hand controls 815 while standing comfortably on the operator platform 610 and so that the operator can lean on the handlebar 810 to assist in the steering effort and add stability in turning.

In walk-behind mode (FIG. 11), the hand controls 815 are positioned behind the rearmost edge of the operator platform 610 (i.e., behind the foot pads 710) a comfortable stride length S. In a preferred configuration, the center of the hand controls 815 is at least about nine inches (9") behind the operator platform 610 to accommodate the stride of an operator on the shorter end of expected range. In another preferred configuration, the hand controls 815 are at least about eleven to twelve inches (11-12") behind the operator platform 610 to accommodate the stride of an operator on the taller end of the expected range. Stated another way, the stride length S of the lawn mower 100 is preferably in the range of about nine to twelve inches (9-12").

A brake-assisted steering feature of the lawn mower 100 will now be discussed with reference to FIGS. 9 and 12. Referring first to FIG. 9, the brake-assisted steering feature includes a band brake 910 extending around a drum 915 mounted to one of the drive shafts 340. The band brake 910 includes a first brake end 910A which is rotatably mounted to a lower bracket 920 which is rigidly mounted to the mower frame 210, and a second brake end 910B which is movable toward and away from the first brake end 910A. When the second brake end 910B is moved toward the first brake end 910A, the band brake 910 tightens on the drum 915 and gives rise to friction which will resist and slow down rotation of the drive shaft 340. It should be noted that the invention is not limited to the illustrated band brake 910, but can also be implemented with other braking mechanisms, such as disk brakes and calipers or any other suitable braking mechanism for the application.

Figure 12:
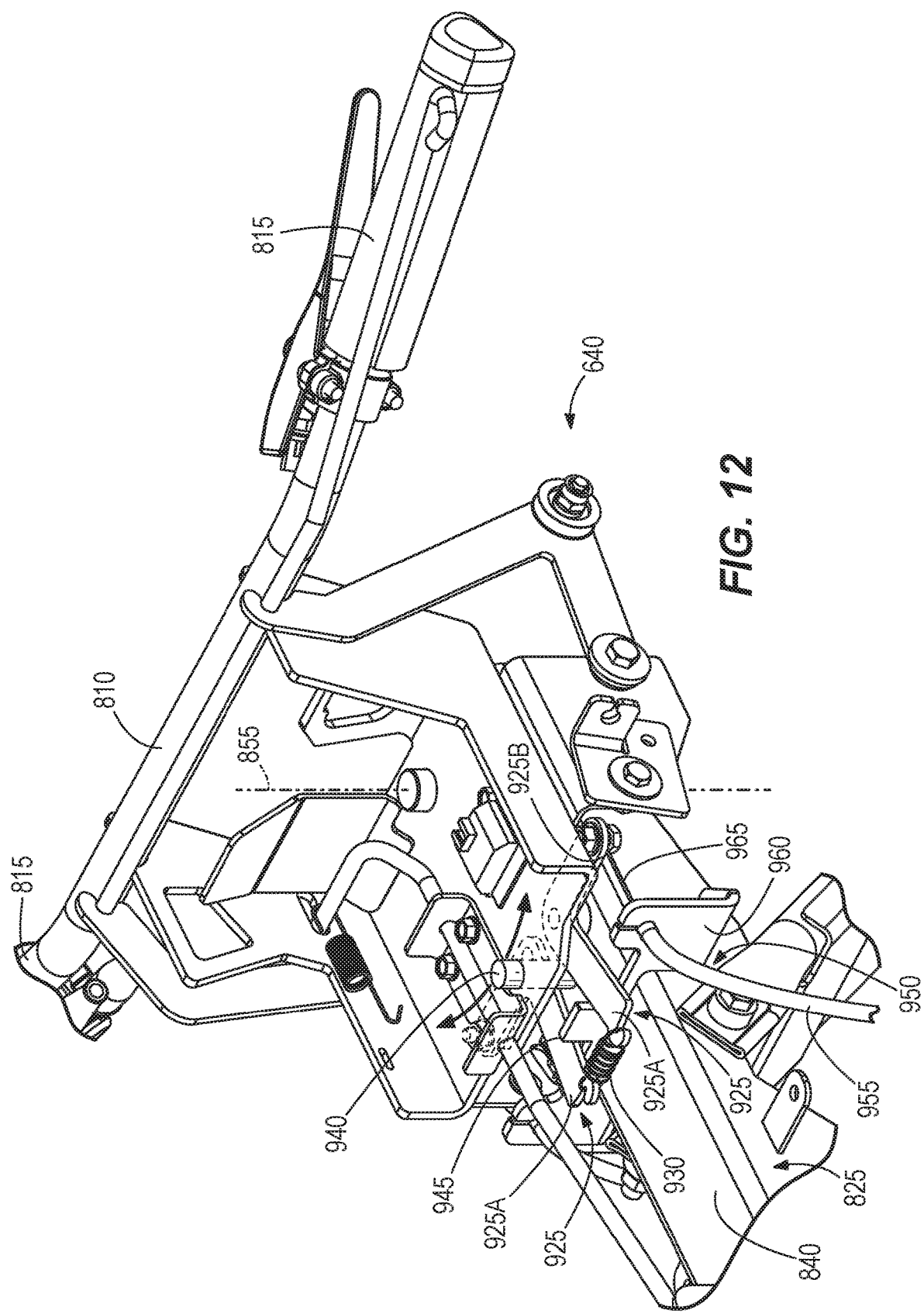
FIG. 12 is an enlarged perspective view of the operator interface illustrating an upper portion of a brake-assisted steering feature.

Referring now to FIG. 12, the brake-assisted steering feature also includes a mechanism for actuating the band brake 910. The mechanism for actuating the band brake 910 includes left and right L-shaped arms 925 that each include a first arm end 925A, a second arm end 925B, and a middle angled portion between the first arm end 925A and second arm end 925B. The middle angled portion of each L-shaped arm is pivotably mounted to the top surface 840 of the interface receiver 825. The first arm ends 925A of the L-shaped arms 925 are interconnected with each other through a brake biasing member, such as the illustrated coil spring 930, to bias the first arm ends 925A toward each other into an at-rest position. The at-rest position corresponds to a centered position of the operator interface 640 on the interface receiver 825, which corresponds to no braking on the drive shafts 340 and straight travel of the lawn mower 100.

The L-shaped arms 925 are between the operator interface 640 and the interface receiver 825, and are pivotable with respect to the interface receiver 825 in response to pivoting of the operator interface 640 about the vertical interface axis 855 mentioned above. More specifically, a boss 940 extending down from the operator interface 640 engages the first arm end 925A of the L-shaped arm 925 on the side to which the boss 940 is pivoted. The boss 940 engages the first arm end 925A of the L-shaped arm 925 to pivot the L-shaped arm 925 in a braking direction (which will be clockwise for one of the L-shaped arms and counterclockwise for the other in the illustrated embodiment). The coil spring 930 pulls the first arm end 925A of the other L-shaped arm 925 against a stop member 945 that is rigidly mounted to the interface receiver 825. As the first arm ends 925A of the L-shaped arms 925 are moved apart, a biasing force develops in the coil spring 930 which tends to draw the first ends 925A toward each other (i.e., opposite the braking direction toward the at-rest position).

Referring now to both FIGS. 9 and 12, the mechanism for actuating the band brake 910 also includes a cable assembly 950 extending between the second arm end 925B and the second brake end 910B on the same side of the lawn mower 100. The cable assembly 950 includes an outer sheath 955 extending between the lower bracket 920 and an upper bracket 960 (FIG. 12) rigidly mounted to the interface receiver 825, and an inner cable 965 that slides in the outer sheath 955 and interconnects the second arm end 925B to the second brake end 910B. When the inner cable 965 is actuated by pivoting the L-shaped bracket 925 in the braking direction, the inner cable 965 pulls the second brake end 910B toward the first brake end 910A, which tightens the band brake 910 around the drum 915.

The operator steers by pushing with one hand and pulling with the other hand the left and right hand controls 815 on the handlebar 810. This pushing and pulling action generates torque about the vertical interface axis 855 of the operator interface 640 and causes the operator interface 640 to pivot about the vertical interface axis 855 with respect to the interface receiver 825. Pivoting of the operator interface 640 with respect to the interface receiver 825 causes boss 940 to engage the first arm end 925A on the inside of the turn radius (i.e., the first end 925A of the left arm 925 for a left or counterclockwise turn and the first end 925A of the right arm 925 for a right or clockwise turn) to pivot in the braking direction, which tightens, through the associated braking cable assembly 950, the associated band brake 910 on the associated drive wheel 345 (all associated elements being on the inside of the turn radius). The braking action slows the rotation of the drive wheel 345 on the inside of the turn radius, resulting in brake-assisted steering that enables the operator to steer the lawn mower 100 with relatively little effort.

During operation on a flat ground surface G, the moment the operator applies between the handlebar 810 and the trailer assembly 120 (or between the handlebar 810 and the ground surface G when in walk-behind) must overcome the resistance of movement due to the tires on the ground (frictional resistance which includes scrubbing and rolling) and the inertia of the machine.

Thus, the invention provides, among other things, a utility machine which includes a work unit and a trailer for supporting an operator in standing-mode, wherein the operator can seamlessly step off the trailer and operate the machine in walk-behind mode. Various features and advantages of the invention are set forth in the following claims.

What is claimed is:

1. A utility machine for use by an operator in a standing mode in which the operator rides the machine in a standing position and a walking mode in which the operator walks behind the machine, the utility machine comprising:
 a machine frame;
 a prime mover supported by the machine frame;
 a tractive element supporting the machine frame with respect to a ground surface, the tractive element being operable under the influence of the prime mover to move the utility machine over the ground surface;
 a work unit supported by the machine frame and configured to perform work under the influence of the prime mover;
 an operator platform adapted to support the operator in the standing mode, the operator platform being in a deployed condition in which the operator platform is a fixed distance from the prime mover in both the standing mode and walking mode;
 a platform connector interconnecting the operator platform with the machine frame;
 an operator interface enabling an operator of the utility machine to control at least one operational aspect of the prime mover, the tractive element, or the work unit, the operator interface including a hand control adapted to be manipulated by the operator's hand; and an interface support assembly interconnecting the operator interface with the platform connector, the interface support assembly being movable with respect to the platform connector to position the operator interface in a first position in which the hand control is accessible by the operator in the standing mode and a second position in which the hand control is positioned rearward of the operator platform and is accessible by the operator in the walking mode, the interface support assembly maintaining the operator interface in a substantially constant attitude to provide constant control of the utility machine in the standing mode, walking mode, and during operator transition between the standing mode and walking mode;

wherein the operator interface pivots with respect to the interface support about a vertical interface axis in response to applying forces to the hand controls; and wherein the tractive element includes a tractive element on each of opposite sides of the machine frame, the utility machine further comprising a brake-assisted steering system which applies a braking force to the tractive element on an inside radius of a turn in response to pivoting of the operator interface about the vertical interface axis.

2. The utility machine of claim 1, wherein the prime mover comprises an internal combustion engine or an electric motor.

3. The utility machine of claim 1, wherein the tractive element on each of opposite sides of the machine frame include left and right drive wheels or left and right track drives.

4. The utility machine of claim 1, wherein the work unit includes a mower deck assembly including a blade rotating under the influence of the prime mover to cut grass.

5. The utility machine of claim 1, wherein the operator platform includes a platform support wheel supporting the operator platform with respect to the ground surface, the platform support wheel rolling over the ground surface in response to movement of the utility machine.

6. The utility machine of claim 1, further comprising a machine support wheel supporting a portion of the weight of the machine frame and passively rolling over the ground surface in response to movement of the utility machine; wherein the platform connector is connected to the machine frame between the tractive element and the machine support wheel such that at least a portion of the weight of the operator is borne by both the tractive element and the machine support wheel.

7. The utility machine of claim 1, wherein the platform connector is connected to the operator platform by way of a pivot joint having a vertical yaw axis.

8. The utility machine of claim 1, wherein the platform connector is yoke shaped with first and second arms on opposite sides of the machine frame, and wherein the first and second arms are connected to the machine frame through horizontal platform mounting axles defining a pitch axis about which the operator platform pivots with respect to the machine frame.

9. The utility machine of claim 1, wherein manipulation of the hand control controls a speed and direction of operation of the tractive element.

10. The utility machine of claim 1, wherein the hand control is positioned at least nine inches behind the operator platform in the walking mode.

11. The utility machine of claim 1, wherein the hand control is positioned nine to twelve inches behind the operator platform in the walking mode.

12. The utility machine of claim 1, wherein:

the interface support assembly includes a pair of A-frame steering elements and an interface receiver to which the operator interface is mounted;

each A-frame steering element includes an upper portion pivotally interconnected to the interface receiver;

each A-frame steering element includes left and right legs extending down from the upper portion to pivotally interconnect to respective left and right sides of the platform connector; and each A-frame steering element occupies a plane generally parallel to the plane of the other A-frame steering element.

* * * * *